2 Sheets—Sheet 1.

J. W. H. DOUBLER & G. F. GODLEY.
SPRING-POWER.

No. 176,607. Patented April 25, 1876.

Witnesses
W. R. Edelen
John Robey Jr.

Inventors
John W. H. Doubler
George F. Godley
John J. Halsted
Att'y

2 Sheets—Sheet 2.
J. W. H. DOUBLER & G. F. GODLEY.
SPRING-POWER.
No. 176,607. Patented April 25, 1876.
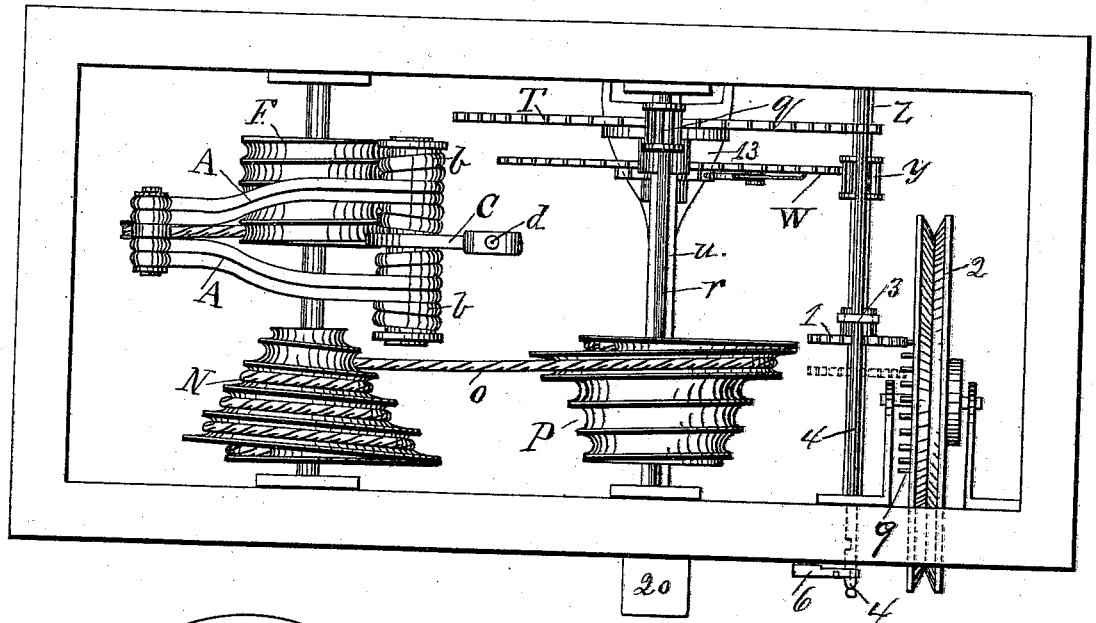
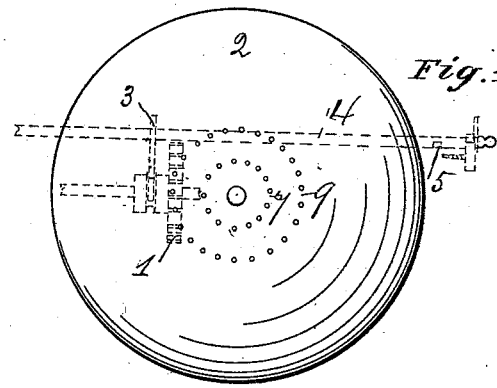
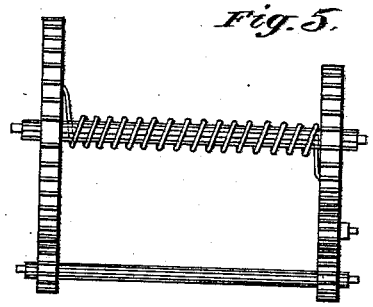
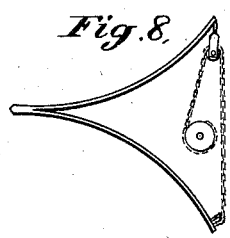
Witnesses
W. R. Edelen
John Robey, Jr.
Inventors
John W. H. Doubler.
George F. Godley.
by John J. Halsted.
Atty

UNITED STATES PATENT OFFICE.

JOHN W. H. DOUBLER AND GEORGE F. GODLEY, OF PHILADELPHIA, PA.

IMPROVEMENT IN SPRING-POWERS.

Specification forming part of Letters Patent No. 176,607, dated April 25, 1876; application filed April 15, 1876.

*To all whom it may concern:*

Be it known that we, JOHN W. H. DOUBLER and GEORGE F. GODLEY, both of the city of Philadelphia, in the county of Philadelphia and State of Pennsylvania, have invented certain new and useful Improvements in Spring Powers or Motors; and we do hereby declare that the following is a full, clear, and exact description thereof, which will enable others skilled in the art to which it appertains to make and use the same, reference being had to the accompanying drawings, and to letters of reference marked thereon, which form a part of this specification.

Our improvements relate to a peculiar construction and arrangement of springs compressed by a cord or cords, or a chain or chains, running over sheaves; to combining the system of springs with a swinging frame or crane, whereby the ends of the springs and their attached sheaves may swing in unison with the lateral shifting of the cord or chain as the same is wound or unwound upon the winding-drum, thereby avoiding the friction of the side draft of the chain against itself or against the grooves of the drum; to combining in one device the brake and the speed-regulator, and controlling both operations with the same lever through the agency of that device; in a special means for instantly changing the power from light to heavy work, as may be required, and without making any change in the spring power itself, and in other details hereinafter set forth. Our spring-power is applicable as a motor generally wherever a comparatively light power is required, such as for driving sewing-machines, gig-saws, printing-presses, paint-mills, portable gas-machines, washing-machines, churns, velocipedes, starting and running of street-cars, light wagons, small pleasure-boats, elevators, fans, &c.

Figure 1:
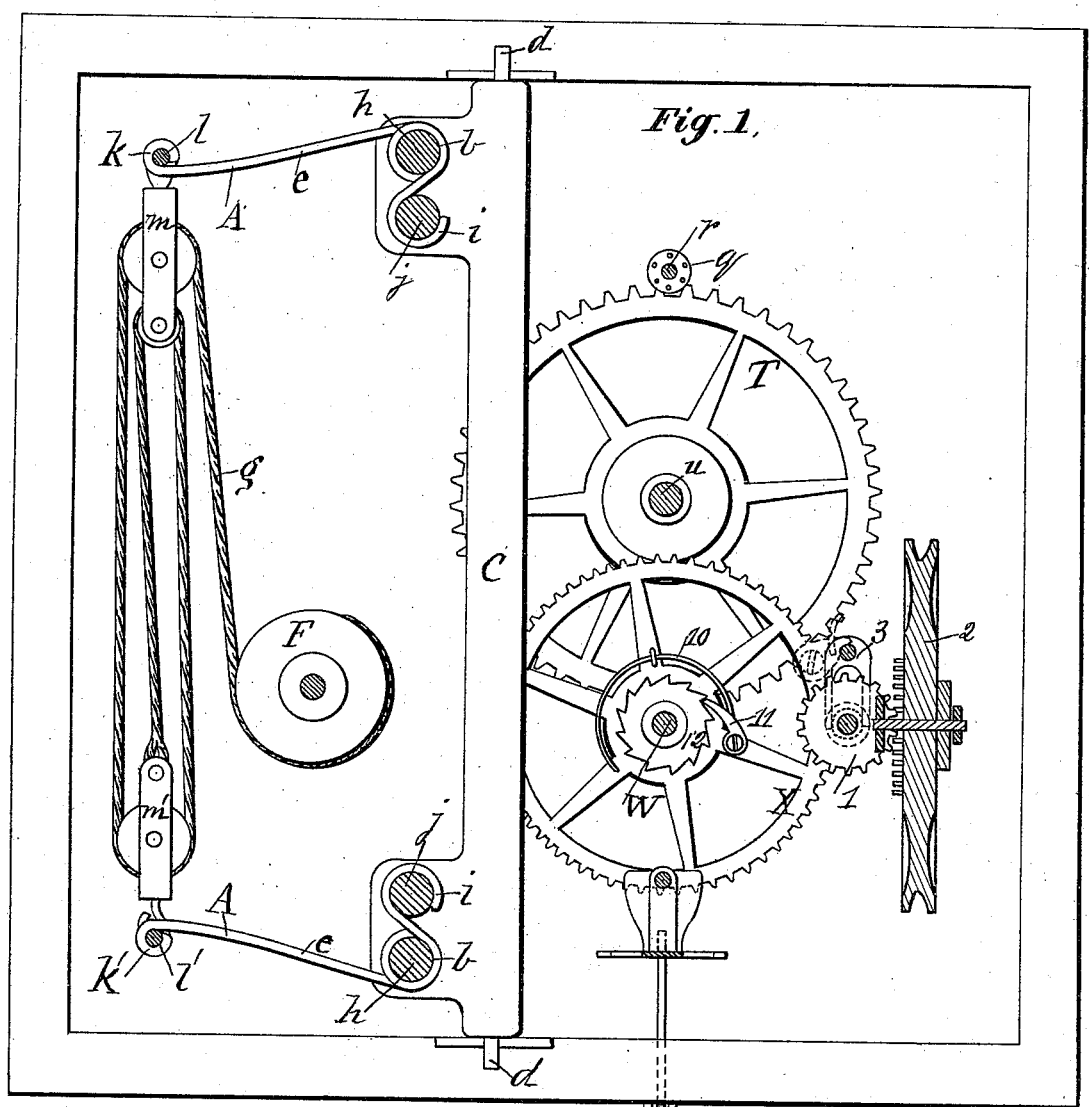
Figure 3:
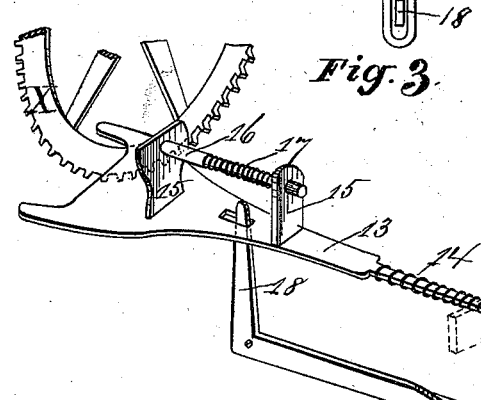

Figure 1 is a vertical longitudinal section of an apparatus embodying our invention; Fig. 2, a top view, the cover being removed the better to display the mechanism; Fig. 3, a perspective of the brake; Fig. 4, a detail, showing the speed-regulator; and Figs. 5, 6, 7, and 8 are different varieties of springs.

The springs are shown at A A, and are arranged in pairs or groups to any number desired, dependent on the amount of power demanded, and they are connected at their coiled ends $b b$ to arms or bolts on a swinging frame or crane, C, which is arranged to turn on pivotal centers $d d$, to permit the lever parts $e e$ of the springs to swing or vibrate laterally in a short arc, about equal in extent to the length of the drum F, about which the cord or chain $g$ is to be wound. The springs are severally coiled and fastened to the arms of the crane by encircling with their coils $b b$ the arms $h h$, the coils being such as to be adapted to be tightened up or reduced in diameter when the mechanism is wound up, their ends $i i$ being held by other arms or stops $j j'$; any other appropriate means of securing them may, however, be used. The swinging ends $k k'$ of the levers $e e$ of these springs are firmly secured to bolts $l l'$, to which are severally connected the sheave-blocks $m m'$, one of which carries a pair of sheaves, and the other a single sheaf or pulley.

These lever-arms $e e$ are, like the spring, made of strong bars or rods, and, when pulled down in winding up the spring-power, they act as powerful levers to coil more of the rod, and also to reduce the diameter of the coils on the arms $h h$, and when wound up they give forth a powerful action, due to the coils, to the torsion of the spring, and to the long leverage of the part $e$, whose fulcrum is at the arm $h$.

The cord or chain $g$ passes from one pulley-block up to and over the smaller pulley in the other block; thence down and over the lower pulley; thence upward and over the upper larger pulley, and thence to the drum F on the same shaft which carries the fusee N. Any desired number of sheaves or pulleys may be employed to suit circumstances. A cord or chain, $o$, from this fusee, passes to the winding-drum P, which is, preferably, made as in the patent to Mr. Doubler, No. 168,729. The pinion $q$ on the key-shaft $r$, which serves to wind up the mechanism for action, gears with a large gear-wheel, T, on the same shaft, $u$, which carries the winding-drum P, and this gear-wheel T imparts motion, by means of a pinion on the shaft W, to the large gear-wheel X on the same shaft, from which wheel X motion is communicated, by means of pinion $y$ on shaft Z, to a small shifting-gear, 1, on the same shaft, this shifting-gear 1 being the direct agent or medium for driving the fly-wheel or band-wheel 2, this wheel 2 having two circles, or more, if desired, of face-teeth, with either of which the shifting-gear may, at will, be made to engage or disengage. The means for such shifting are as follows: The gear 1 is connected with a sliding piece, 3, which is free to be moved lengthwise on the shaft, and which is itself connected to a rod, 4, which projects at one end outside the box or case containing the mechanism, and is provided with a series of notches, 5 5, adapted severally to receive a button or locking-piece, 6. When, by pulling outward, the rod 4 until gear 1 engages with that circle of face-teeth, 7, which is nearest the center or axis of the driving or fly wheel 2, the power required to drive the wheel would be the greatest, as when, for instance, the spring-power is at its maximum, or has just commenced to expend itself; and upon pushing the gear 1 inward, so that it shall engage with that circle of teeth, 9, which is farthest from the center of wheel 2, the power required to drive will be at the least or minimum, as the leverage which moves the wheel is then the greatest, and this position of gear 1 is adapted to that stage where less power is needed to drive the wheel, or where the power is diminished or diminishing.

By these means the power may be varied or changed at will, and instantly, according to the character of work to be done.

A spring, 10, and pawl 11, engaging with the ratchet 12 on the wheel X or its shaft, serve to prevent back motion.

The brake and speed-regulating mechanism is as follows: A bar or rod, 13, extending across the frame, is arranged in its bearings, so as to have a short endwise play, and against the pressure of a reacting spring, 14. This rod carries uprights 15 15, which support the brake-bar 16 and its delicate reacting spring 17, the end of this brake-bar 16 being adapted and arranged to bear against the face of the cog-wheel X near its outer edge, as shown in Fig. 3. To the rod 13 is connected an elbow-lever, 18, centered or pivoted at 19, and extending so as to project outside the frame or case, where it is provided with a foot-piece, 20, that it may be operated by the foot like a treadle.

The operation of the brake will now be apparent. Upon pressing down the lever 18, the brake bar or rod is withdrawn from impinging upon the face of the wheel X; but upon releasing the foot from the lever, the bar 13 is returned to place by its spring 14, carrying with it the bar 16, until it comes again against the wheel X, when the light spring 17 comes again into action, and by its compression exerts a gentle pressure upon the wheel.

The forms of springs shown in Figs. 5, 6, and 7, illustrate other constructions of springs, each having two free ends—that in Fig. 7 having a chain and pulley.

The fusee and the winding-drum P act as an equalizer of power, the same as in the patent, No. 168,729, above named.

When the apparatus is in the process of being wound up, the system of springs A A is so actuated that their levers e e are drawn toward each other, and at the same time their coils b b are wound tighter, until the winding is completed. During the process, either of winding or unwinding, the swinging crane, which carries and sustains the levers or springs, automatically accommodates itself to the changing position of the cord or chain on the drum M, so that the pull may be always straight and direct, and not constantly varying, as it must be where the sheaves have a fixed or permanent position. A large amount of waste power is thus avoided, and much wear, besides other manifest disadvantages. It will also be noted that the lever and spring are integral, having no artificial joint or connection, so that there is no weak point in them, and they are simply and cheaply made, while very powerful and efficient.

The present construction also dispenses with considerable gearing which would be otherwise required, and to that extent relieves of so much dead-weight and friction; the levers or lever-springs thus also permit the machine to be made simpler, cheaper, and lighter.

What we claim as new in spring-power mechanism is as follows:

1. As prime motors, the lever-springs A A, terminating in a coil at their fixed ends, and connected at their opposite ends to the drum cord or chain g, substantially as shown and described.

2. The combination of the lever-springs A A with a swinging frame or crane, substantially as and for the purpose set forth.

3. The combination of lever-springs A A, sheaves, swinging crane, and drum F, substantially as and for the purpose set forth.

4. The combination of the rod 13, spring 14, brake-bar 16, spring 17, and foot-lever 18, the brake-bar serving as a brake and speed-regulator, and being substantially as shown and described.

5. The combination, with the wheel 2, provided with concentric sets of teeth upon its face, of the shifting-gear 1, provided with a locking mechanism, the combination serving as a means for changing or varying the power at will.

6. A motor receiving its impulse from the torsion-strain of a spiral spring or springs, as shown and described.

In testimony that we claim the foregoing as our own we affix our signatures in presence of two witnesses.

JOHN W. H. DOUBLER.
GEORGE F. GODLEY.

Witnesses:
FRED. E. UBER,
JACOB R. MASSEY.